(No Model.)
L. W. MURCH.
BUTTER WORKER.
No. 323,879.     Patented Aug. 4, 1885.
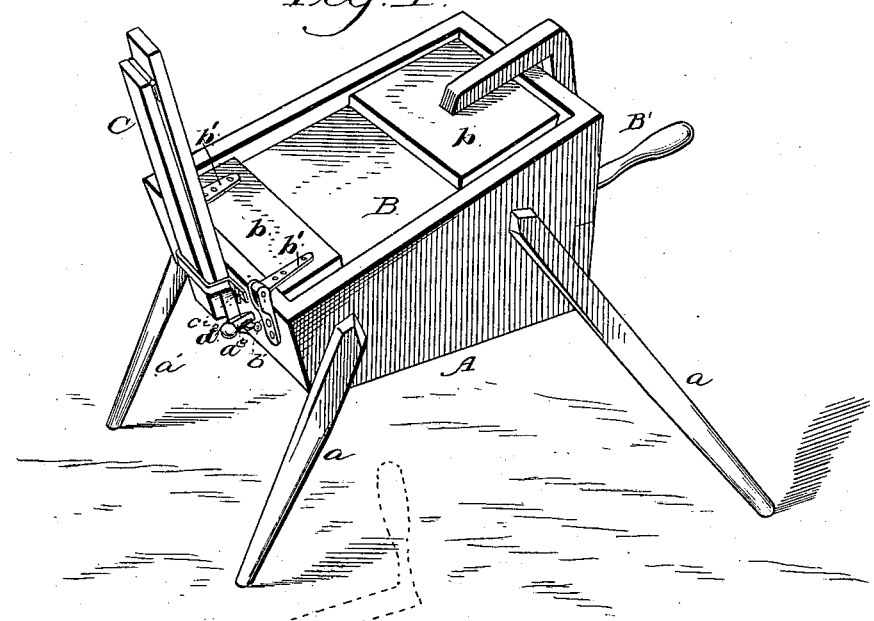
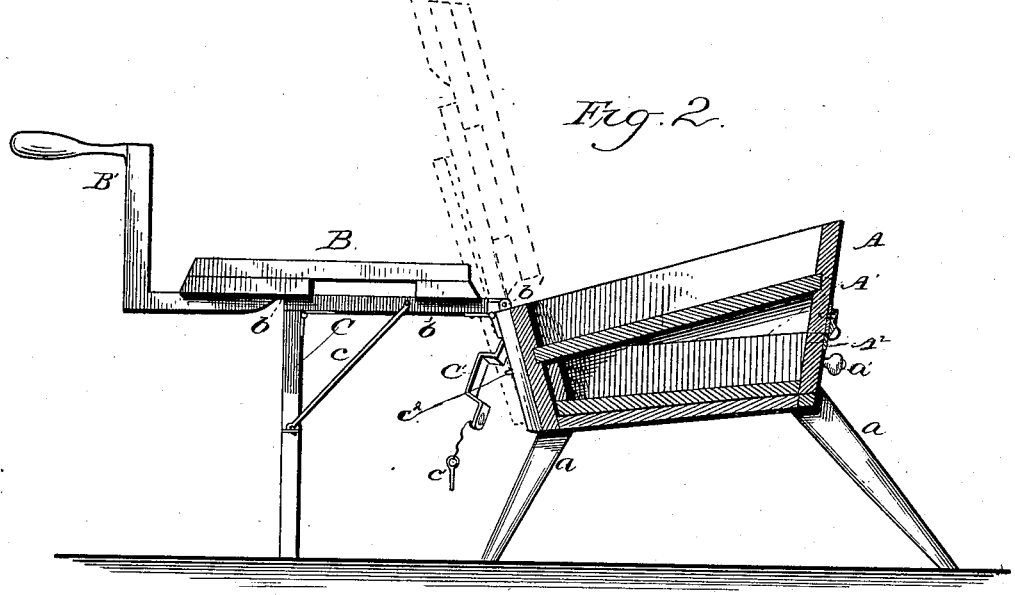
WITNESSES
J. W. Reynolds
Charles S. Hyer
INVENTOR
Lewis W. Murch
By his Attorney
O. W. Marble

UNITED STATES PATENT OFFICE.

LEWIS W. MURCH, OF RACINE, WISCONSIN.

BUTTER-WORKER.

SPECIFICATION forming part of Letters Patent No. 323,879, dated August 4, 1885.

Application filed April 1, 1885. (No model.)

*To all whom it may concern:*

Be it known that I, LEWIS W. MURCH, a citizen of the United States, residing at Racine, in the county of Racine and State of Wisconsin, have invented certain new and useful Improvements in Butter-Workers, of which the following is a specification, reference being had to the accompanying drawings.

My invention relates to butter-workers; and it consists in the construction and arrangement of the parts hereinafter more fully described, and pointed out in the claim.

The object of my invention is to provide a butter-worker simple in construction, cheaply manufactured, and readily understood, with which the milk may be quickly and easily removed from the butter by pressure without rubbing, sliding, or grinding the same, and in which, at the same time the milk is being removed, salt may be evenly and thoroughly mixed and incorporated in the butter.

In the butter-workers heretofore constructed the milk has been removed from the butter by rubbing, by grinding, or by a sliding movement. These methods break the globules, and thereby destroy the grain of the butter. By my method and mechanism the globules remain unbroken, and the grain of the butter is retained in the greatest perfection. The perfect preservation of the grain of the butter is of the greatest importance, as thereby its flavor is retained and rancidity practically prevented.

In carrying out my invention I employ a tray or oblong box set in or firmly attached to a frame at a suitable incline and convenient height, which tray is provided with an opening near its lower end for draining off the milk. To this tray I attach, by suitable hinges, a follower shorter and narrower than the tray, and provided with a handle. This follower has a folding leg to support it in convenient position, when it is thrown back. Into this tray, the follower being turned back, butter taken from the churn is placed in suitable quantity, and the follower is then brought down by means of the handle, and the butter pressed into a thin sheet or layer, the milk exuding therefrom being carried off through the opening in the tray above mentioned. The follower is then raised by the operator, the layer of butter rolled or folded upon itself, and again pressed by the follower. This operation is continued until the milk is entirely removed from the butter. During the pressing, salt is sprinkled upon the sheet or layer of butter in suitable quantity, and, as the same is pressed, folded, and pressed again, is thoroughly and evenly mixed and incorporated therewith.

Having thus indicated the nature and scope of my invention, I will now describe the apparatus I prefer to use in carrying it out, which is illustrated in the accompanying drawings, and in which like letters of reference refer to similar parts.

Figure 1 is a perspective view of my apparatus closed. Fig. 2 is a longitudinal vertical section of the same, showing the follower and handle raised in dotted lines, and also thrown back and resting upon a supporting foot.

In the drawings, A represents the body or frame of my apparatus, and A' the tray or open box set in and forming a part thereof. This frame is supported by legs $a$ $a$, rigidly or removably attached, and may have, if desired, a drawer, $A^2$, to hold salt, sieves, paddles, &c., and is provided with a handle, $a'$, and a suitable lock. It also has an opening, $a^2$, for draining off the milk, and a plug or stopper, $a^3$, for closing the same during the pressing and kneading of the butter.

B represents the follower, having cross-pieces $b$ $b$.

B' represents the handle attached to the follower B, and $b'$ $b'$ the hinges by which it is hinged to frame A.

C is a supporting hinged leg for follower B, and is provided with brace-hook $c$.

C' is a clamp to hold said leg when folded, and is provided with a pin, $c'$, to fit into staple $c^2$, in frame A, and hold said leg in a folded position. All of the parts of this apparatus, except the hinges and locking devices, which are of metal, are preferably made of wood, but may be made of any other suitable material. When made of wood, it is light and easy to handle, and may be carried from place to place without difficulty. Its height may be readily adapted to the stature of any person, and its size suited to the requirements of any dairy. It may be made with or without the the drawer $A^2$, and if made without it its cost is greatly lessened.

It is obvious that many changes may be made in its construction without departing from the principle of the invention.

I am aware that butter-workers have been made employing trays and devices for forcing the milk out of the butter, but in such apparatuses the milk has been forced out of the butter by rubbing, grinding, or a sliding movement, and not by pressure simply. This feature of my invention—removing the milk by pressure only—is of the greatest importance and utility, for thereby the globules are uninjured and the grain of the butter perfectly preserved.

Having thus described my invention, what I claim, and desire to secure by Letters Patent, is—

A butter-worker comprising frame A, having legs $a\ a$, tray A′, provided with opening $a^2$, and plug $a^3$, a follower, B, hinged to frame A by hinges $b'\ b'$, and having cross-pieces $b\ b$, handle B′, supporting-leg C, provided with brace-hook $c$, and clamp C′, and drawer $A^2$, with handle $a'$, and a suitable lock, all constructed and arranged substantially as described, and for the purposes set forth.

In testimony whereof I affix my signature in presence of two witnesses.

LEWIS W. MURCH.

Witnesses:
CHARLES S. HYER,
JOHN T. ARMS.